(12) United States Patent
Kanematsu

(10) Patent No.: US 7,068,026 B2
(45) Date of Patent: Jun. 27, 2006

(54) SENSOR SIGNAL CIRCUIT AND MEASURING INSTRUMENT

(75) Inventor: Toshihiro Kanematsu, Miyazaki (JP)

(73) Assignee: Mitutoyo Corporation, Kanagawa (JP)

( * ) Notice: Subject to any disclaimer, the term of this patent is extended or adjusted under 35 U.S.C. 154(b) by 0 days.

(21) Appl. No.: 11/099,552

(22) Filed: Apr. 6, 2005

(65) Prior Publication Data
US 2005/0228600 A1    Oct. 13, 2005

(30) Foreign Application Priority Data
Apr. 12, 2004    (JP)    ............................. 2004-116972

(51) Int. Cl.
G01R 31/28    (2006.01)

(52) U.S. Cl. .................................. 324/158.1
(58) Field of Classification Search .................... None
See application file for complete search history.

(56) References Cited

U.S. PATENT DOCUMENTS 5,669,225 A * 9/1997 Beaverson et al. ........... 62/201

FOREIGN PATENT DOCUMENTS

JP    A 06-129810    5/1994
JP    A 11-086180    3/1999

* cited by examiner

Primary Examiner—Jermele Hollington
Assistant Examiner—Trung Q. Nguyen
(74) Attorney, Agent, or Firm—Oliff & Berridge, PLC (57) ABSTRACT

A sensor signal circuit of the present invention includes a tacho generator (42) for detecting revolution speed of a motor and outing a detection result as a sensor signal converted to a voltage, and a controller (5) for driving and controlling the motor (41) based on the sensor signal from the tacho generator (42). The sensor signal circuit further includes a voltage to current converter (43) for outputting a current in proportion to the voltage output from the tacho generator (42) as a sensor signal current, a cable (6) connecting the voltage to current converter (43) and the controller (5), and a resistor (511) for converting the current to a voltage.

8 Claims, 8 Drawing Sheets

SENSOR SIGNAL CIRCUIT AND MEASURING INSTRUMENT

BACKGROUND OF THE INVENTION

1. Field of the Invention

The present invention relates to a sensor signal circuit and a measuring instrument.

2. Description of Related Art

There has been known a sensor signal circuit including a drive unit, a sensor for detecting a driving state of the drive unit and outputting a sensor signal, and a controller for driving and controlling the drive unit according to the sensor signal from the sensor, and a measuring instrument using this sensor signal circuit therein has been practically used.

Figure 6:
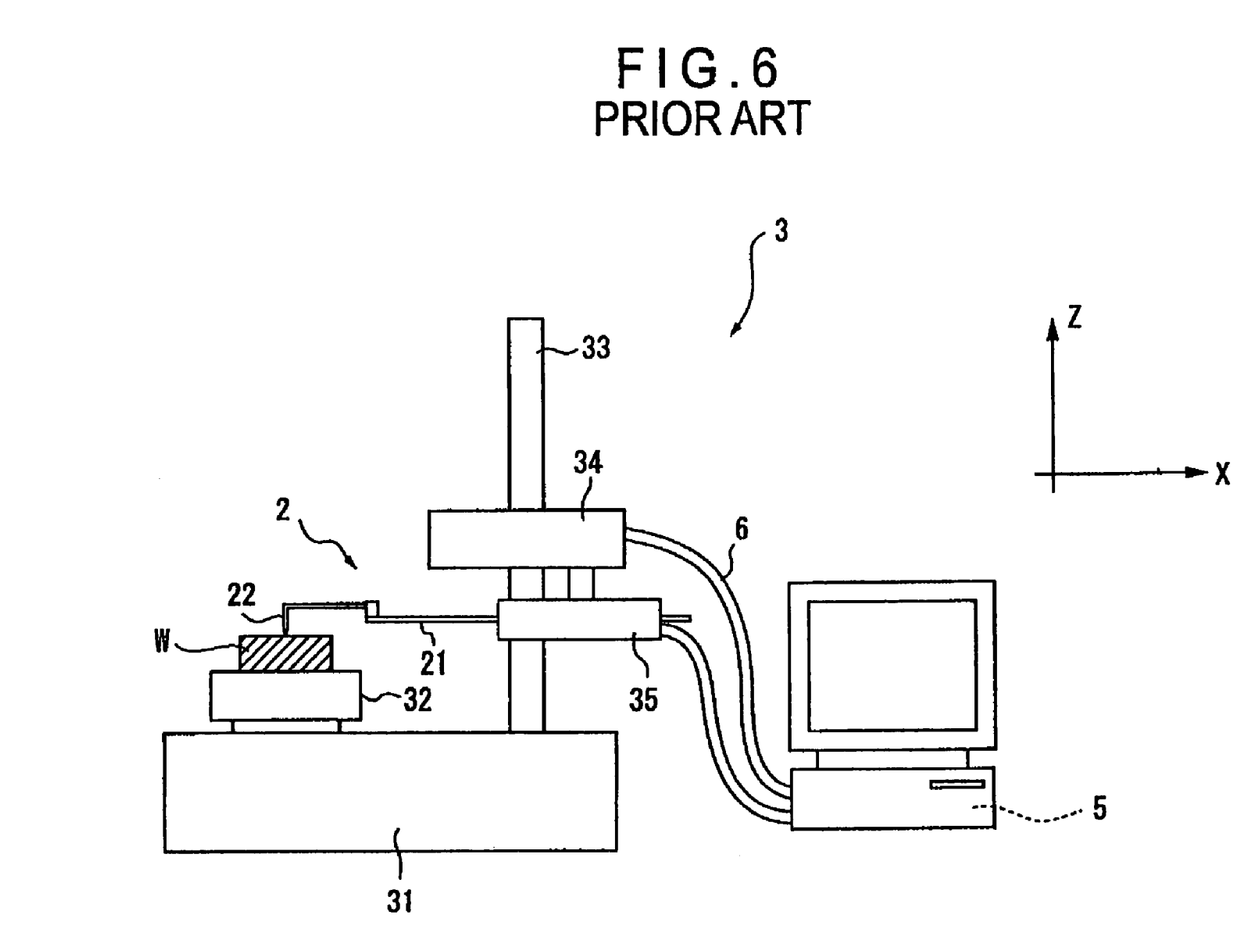
FIG. 6 is a view showing a measuring instrument based on the prior art.

As a measuring instrument 1 as described above, there has been known a contour measuring instrument including, as shown in FIG. 6, a probe 2 for scanning a surface of a workpiece W, a device body 3 for driving this probe 2, a computer circuit 5 for controlling the device body 3, and a cable 6 for connecting the computer circuit 5 to the device body 3.

The device body 3 includes a Y-axis slider 32 provided on a table 31 for sliding the workpiece W in the direction Y (in the vertical direction in a page showing FIG. 6), a Z-axis drive shaft 33 provided in the upright state on the table 31, a Z-axis slider 34 slidably provided along the longitudinal direction of the Z-axis drive shaft 33, and an X-axis slider 35 provided to the Z-axis slider 34 and capable of sliding in the direction X, and the probe 2 is provided to the X-axis slider 35.

There are provided a Z-axis linear encoder for detecting a travel of the Z-axis slider 34, an X-axis linear encoder for detecting a travel of the X-axis slider 35, and a Y-axis linear encoder for detecting a travel of the Y-axis slider 32.

The probe 2 includes a stylus arm 21 provided substantially in parallel to the X-axis direction with one edge side thereof supported by the X-axis slider 35, and a stylus 22 as a measuring element provided at the other edge side of the stylus arm 21 along the Z-axis direction and contacting a surface of a workpiece. The stylus arm 21 is supported by the X-axis slider 35 so that the stylus arm 21 can move along a small arc on the X-Z plain, and a displacement detector (not shown) for detecting oscillation of the stylus arm 21 inside the X-axis slider 35.

The computer circuit 5 and the device body 3 are connected to each other with the cable 6, and a driving speed (a control target) of the X-axis slider 35 is controlled according to a control instruction from the computer circuit 5.

Figure 7:
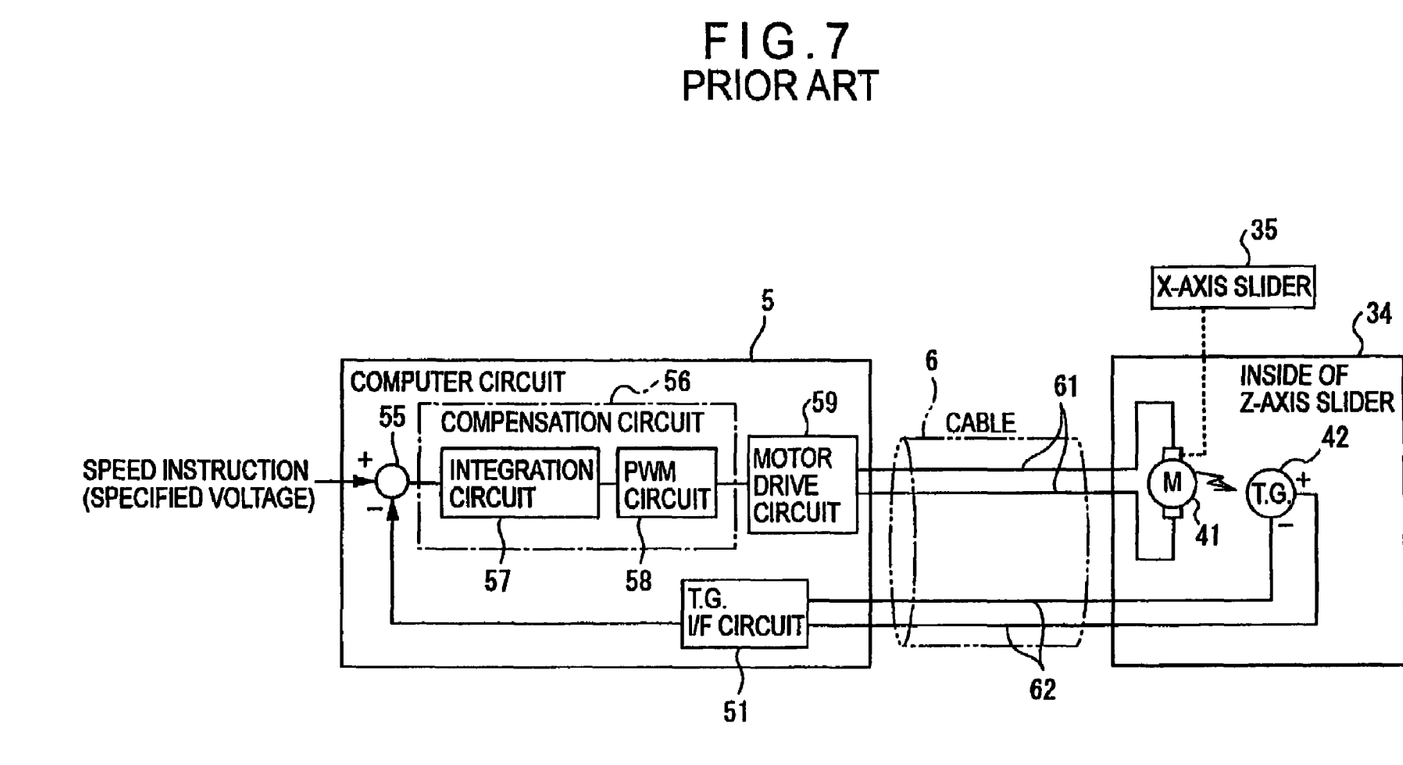
FIG. 7 is a view showing an arrangement of a sensor signal circuit used in the measuring instrument based on the prior art and FIG. 8 is a view showing a circuit arrangement from a tacho generator up to an interface circuit in the prior art.

FIG. 7 shows an arrangement of a circuit as a voltage signal transmitting section provided inside the Z-axis slider 34 for driving the X-axis slider 35 and also arrangement of the computer circuit 5 as a controller which is a voltage signal receiving section. The circuit provided inside the Z-axis slider 34, computer circuit 5, and cable 6 form a sensor signal circuit.

An inside portion of the Z-axis slider 34 includes a motor 41 as a drive unit for driving the X-axis slider 35, a tacho generator 42 as a sensor for detecting the revolution speed of the motor 41 and generating a voltage proportional to the revolution speed of the motor 41 as a sensor signal. The tacho generator 42 is a sensor as a revolution detector for detecting revolution of the motor 41 and is also a generator for generating power according to revolutions of the motor 41. The motor 41 is a coil motor for rotating a rotator.

The computer circuit 5 includes an interface circuit 51 (T.G. I/F circuit) for receiving a voltage value of the sensor signal from the tacho generator 42, a comparator 55 for comparing a voltage value from the interface circuit 51 to a specified voltage value input from the outside and specifying the revolution speed of the motor 41 to output the difference, a compensation circuit 56 for compensating characteristics of an output from the comparator 55, and a motor drive circuit 59 as a drive unit for driving the motor 41 according to an output from the compensator circuit 56.

The compensation circuit 56 includes an integration circuit 57 for performing integral compensation on an output from the comparator 55 for compensation, and a PWM circuit 58 (Pulse Width Modulation circuit) for shaping a waveform of an output from the integration circuit 57.

The computer circuit 5 and inside circuit of the Z-axis slider 34 are connected with the cable 6. The motor drive circuit 59 and the motor 41 are connected to each other with a transmission line 61 for transferring an instruction from the motor drive circuit 59 to the motor 41. The tacho generator 42 and the interface circuit 51 are connected to each other with a transmission line 62 for transferring the voltage from the tacho generator 42 to the interface circuit 51.

Operations of the measuring instrument 1 having the arrangement as described above will be described below.

First, a workpiece W is placed on the Y-axis slider 32, and the Z-axis slider 34 is displaced so that the stylus 22 is contacted to a surface of the workpiece. A measuring speed for measurement is input into the computer circuit 5. Namely, a driving speed of the X-axis slider 35 is it into the computer circuit 5. The input driving speed of the X-axis slider 35 is converted to a revolving speed of the motor 41, and further to a voltage value corresponding to the revolving speed of the motor 41, and is input as a specified voltage value to the comparator 55.

The specified voltage value input into the comparator 55 is transmitted through the transmission line 61 of the cable 6 via the compensation circuit 56 and motor drive circuit 59 to revolve the motor 41. When the motor 41 starts revolving, the X-axis slider 35 is driven. When the X-axis slider 35 is driven, the stylus 22 is moved for scanning in the X-axis direction along the surface of the workpiece, and the stylus 22 is displaced in the Z-axis direction along irregularities on the surface of the workpiece. Displacement of the stylus 22 is delivered as oscillation of the stylus arm 21 and is detected by a displacement detector inside the X-axis slider 35. In this step, contour of the surface of the workpiece can be measured by sampling a position of the Z-axis slider 34, a position of the X-axis slider 35, and an oscillation rate of the stylus arm 21. Further, by sliding the Y-axis slider 32, the entire surface of the workpiece can be measured.

The revolution speed of the motor 41 is detected by the tacho generator 42, and a voltage (sensor signal) corresponding to the revolution speed of the motor is output. The voltage from the tacho generator 42 is transmitted through a transmission line 62 of the cable 6 and is received by the interface circuit 51. The voltage value received by the interface circuit 51 is sent to the comparator 55. The comparator 55 compares the specified voltage value to the voltage value from the interface circuit 51, and feeds back the difference via the compensation circuit 56 and motor drive circuit 59 to the motor 41. Then the revolution speed of the motor 41 is controlled at a constant value according to this feed-back information.

By constantly controlling the revolution speed of the motor 41, a driving speed of the X-axis slider 35 can be controlled at a constant value. Then a scanning speed of the stylus 22 can be controlled at a constant value, so that measurement values can be stabilized.

With the sensor signal circuit and measuring instrument 1 using the same, however, the following problems occur.

Inside of the Z-axis slider 34 and the computer circuit 5 are connected with the cable 6. Sometimes electromagnetic coupling based on a combination of an electric field from the outside and a magnetic field may occur inside the cable 6, and noises are mixed in a transmitted signal (voltage).

Figure 8:
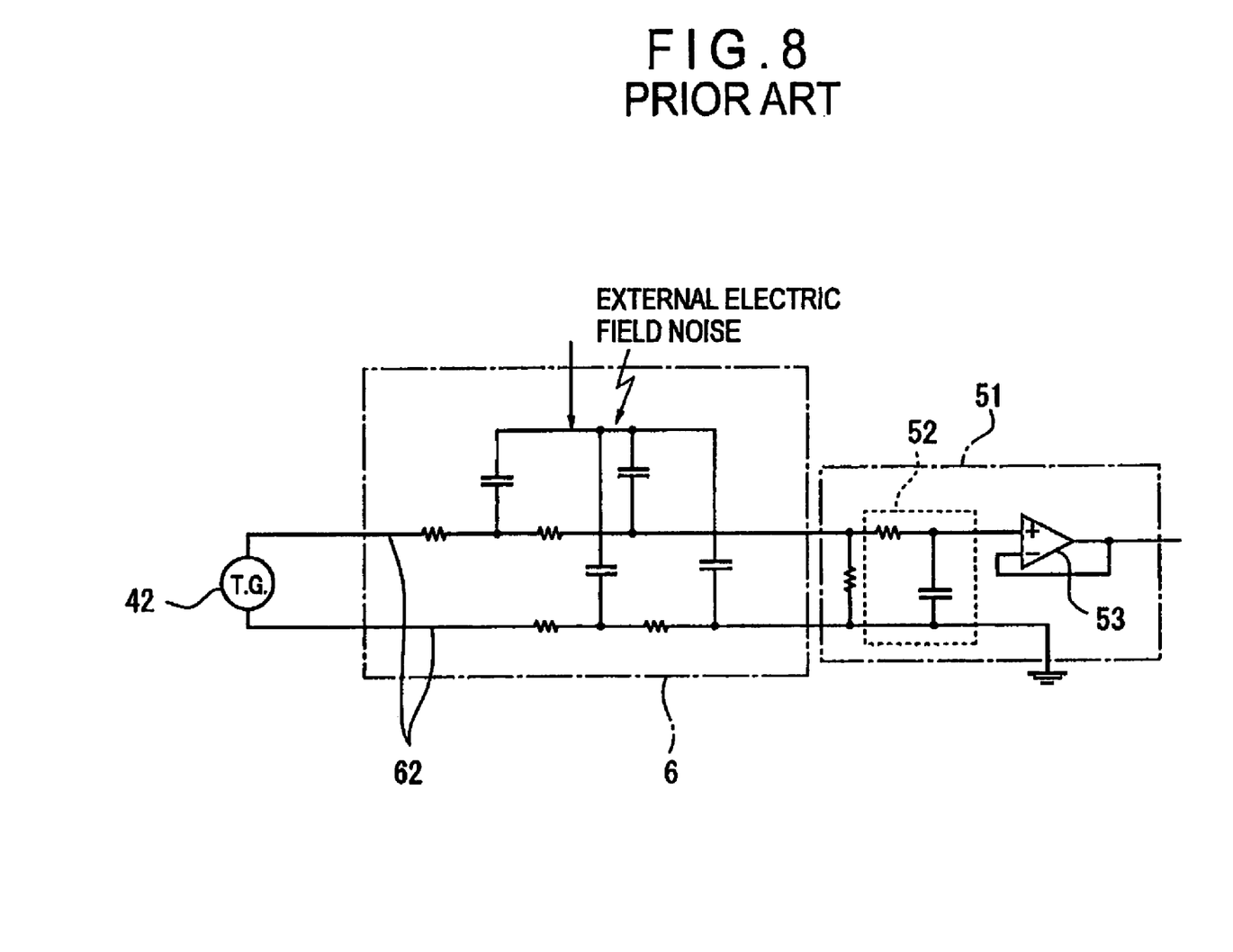

In FIG. 8, the an transmission line 62 is equivalently replaced with a linear element (such as a resistor or a capacitor) to show influences by an electric field over the transmission line 62 from the tacho generator 42 to the interface circuit 51. When an influence by an external electric field occurs in the transmission line 62 shown in FIG. 8, noises due to the capacitive coupling are generated in the transmission line 62.

To remove the noises, it is conceivable to provide a low-pass filter 52 in the interface circuit 51 as shown in FIG. 8. In FIG. 8, further a noninverting amplifier 53 for amplifying an output from the low-pass filter 52 is provided. Noises can be cut off to some extent by the low-pass filter 52 provided in the inter circuit 51. However, to sufficiently reduce noises, a cut-off frequency in the low-pass filter 52 must be set at a low value. When the cut-off frequency is set at a too low value, control over a motor is disabled, so that noises can not be removed only with the low-pass filter 52.

Further, when a voltage transmitted over the cable 6 is small sometimes a voltage transmitted as a signal may disadvantageously be affected by an electric field from the outside to become ambiguous. When the motor 41 is revolved at a low speed, a voltage output from the tacho generator 42 is small. For instance, if the revolution speed of a motor is 4 rpm, a voltage output from the tacho generator 42 is in the range from 2 mV to 4 mV. When a voltage output from the tacho generator 42 is small noises are generated in the cable 6, and the revolution speed of the motor 41 can not correctly be delivered to the computer circuit 5. In this case, control over the revolutions of the motor 41 can not normally be carried out, so that the revolution speed of the motor may disadvantageously drop or become unstable.

As a method of increasing a voltage delivered as a sensor signal output from the tacho generator 42 even when the motor 41 revolves at a low speed, an arrangement is conceivable, in which a gear is provided between the motor 41 and the tacho generator 42 to differentiate the revolution speeds of the motor 41 and the tacho generator 42. However, since there is a limit for the revolution speed of the tacho generator 42, the maximum revolution speed of the motor 41 must be reduced. When the maximum revolution speed of the motor 41 is limited, a driving speed of the X-axis slider 35 is limited, so that the driving speed disadvantageously drops. For instance, when the maximum scanning speed of the X-axis slider 35 is limited to about 5 mm/s, a long period of time is required for measurement, which lowers the measurement efficiency.

When the problems as described above are taken into consideration, the revolution of the motor 41 cannot be controlled in a wide range from low revolution speed to high revolution speed. Namely, a measuring speed of the measuring instrument 1 can be set only within a narrow range.

Also there is the following problem.

Because of the transmission line 62 in the cable 6, a reference electric potential for the tacho generator 42 is the same as that for the interface circuit 51, so at the voltage is delivered between the tacho generator 42 and the interface circuit 51 under this reference electric potential. However, when noises come into the cable 6 from an external electric field, potential difference is generated between the interface circuit 51 and the tacho generator 42, namely, the both do not have the same reference voltage. In this case, when a reference electric potential for the tacho generator 42 is higher, a voltage of the sensor signal output from the tacho generator 42 is at a value including this reference electric potential. The voltage of this sensor signal is transmitted over the transmission line 62, and when the interface circuit 51 receives the voltage value for this sensor signal, the interface circuit 51 receives the voltage as a voltage measured from a low reference electric potential. Namely, the interface circuit 51 receives the voltage as a voltage (potential difference) higher than the voltage output from the tacho generator 42 (potential). Then, the voltage received by the interface circuit 51 indicates a higher revolution speed as compared to the revolution speed of the motors 41 detected by the tacho generator 42. When the voltage received by the interface circuit 51 is input to the comparator 55 and subtracted from the specified voltage value, a voltage fed into the motor 41 has a value smaller than a desired value. Then, the revolution speed of the motor 41 becomes lower than a predetermined revolution speed. When the potential difference is generated in the transmission line 62 by the external electric field as described above, the revolution speed of the motor detected by the tacho generator 42 can not correctly be fed back to the computer circuit 5. As a result, the revolution speed of the motor 41 can not accurately be controlled.

When the device body 3 and the computer circuit 5 are provided with a large distance therebetween, length of the cable 6 for connecting the computer circuit 5 to the Z-axis slider 34 is required to be long. When a position of the measuring instrument 1 in a plant is taken into consideration, there should be a freedom in the distance between the device body 3 and the computer circuit 5 for convenience, and for instance, the freedom of the length is desired to be around six meters. However, the longer the cable 6 is, the larger the influence by the external electric field becomes. When the influence by the external electric field is large, transmission of a signal with a lower voltage becomes more difficult because of noises, so that a larger potential difference is generated between the tacho generator 42 and the interface circuit 51. Because of the noises generated in the cable 6, it is difficult to lengthen the cable 6. Therefore, there occurs the problem that the device 3 and the computer circuit 5 can not be provided with a large distance therebetween.

The problem as described above is not limited to the measuring instrument 1 (contour measuring instrument) described above, but is common to a sensor signal circuit including a voltage signal transmitting section having a sensor for outputting a result of detection as a voltage signal, a cable for transmitting a signal from the sensor, a voltage signal receiving section for receiving the transmitted signal as well as to a measuring instrument using the sensor signal circuit. Especially, the problem described above becomes remarkable when the sensor outputs a result of detection as a voltage waveform.

SUMMARY OF THE INVENTION

An object of the present invention is to provide, for solving the problem in the prior art, a sensor signal circuit capable of reducing influences by noises from electromagnetic coupling over a cable connecting a voltage signal transmitting section and a voltage signal receiving section to accurately communicate a signal and a measuring instrument using the sensor signal circuit.

A sensor signal circuit according to an aspect of the present invention includes: a voltage signal transmitting section having a sensor for transmitting a result of detection as a voltage signal; a voltage signal receiving section for receiving the voltage signal; a voltage to current converter having a noninverting voltage-current type converting unit provided in the voltage signal transmitting section side for converting the voltage signal to a current in the noninverted state and an inverting type voltages current converting unit for converting the voltage signal to a current in the inverted state, and for converting the voltage signal to a current signal in accordance with the voltage thereof; a voltage converter provided in the voltage signal receiving section side for converting the current signal to a voltage to obtain the voltage signal; a feed-in cable for transmitting the current signal from the noninverting type voltage-current converting unit to the voltage converter; and a feed-back cable for transmitting the current signal returning from the voltage converter to the inverting type voltage to current converter.

With the arrangement as described above, a result of detection by the sensor can be output as the voltage signal. This voltage signal is converted to a current in the noninverted state by the noninverting type voltage-current converting unit, and is transmitted as a source current through the feed-in cable to the voltage signal receiving section.

The voltage signal is inverted to a current by the inverting voltage-current converting unit and is transmitted as a sink current through the feed-back cable to the voltage signal receiving section. In the voltage signal receiving section, this source current is delivered via the voltage converter to the sink current and is converted by the voltage converter to a voltage to obtain the voltage signal.

As described above, the voltage obtained by the voltage converter is determined by the source current and the sink current. Therefore, when influence of noises from the external electric field is generated, an absolute voltage generated in each of the feed-in cable and feed-back cable fluctuates, but an equal voltage is loaded to the two terminals of the voltage converter or the voltage is reduced, so that the voltage converted by the voltage converter does not change. As a result, the voltage signal detected by the sensor is accurately transmitted to the voltage receiving section.

In the present invention, the voltage converter preferably has a voltage conversion resistor and a differential amplifier for converting voltages at the both ends of the voltage conversion resistor to an output voltage signal.

With the arrangement as described above, the voltages at two ends of the voltage conversion resistor can be amplified and converted to the output voltage signal.

An input impedance in the differential amplifier is preferably higher as compared to that in the voltage conversion resistor. When the input impedance is high, even if a resistance value in the voltage conversion resistor is high, the voltages at two ends can accurately be amplified. Further, a noise voltage loaded on the two ends of the voltage conversion resistor by an external electric field can be removed.

Further, the sensor preferably outputs a voltage signal by referring the ground as a reference and also the differential amplifier preferably outputs an output voltage signal by referring the ground as a reference. With the arrangement as described above, both the voltage signal from the sensor and the output voltage signal are based on the equal reference electric potential.

In the present invention, it is preferable that has a drive unit and the sensor for detecting the driving state of the drive unit and outputting a result of detection as the voltage signal is provided in the voltage signal transmitting section; a controller for driving and controlling the drive unit based on the output voltage signal is provided in the voltage signal receiving section; and also a control cable for transmitting a control signal from the controller to the drive unit is provided therein, in which the drive unit is feed-back controlled according to the control signal.

With the arrangement as described above, when the drive unit runs, this driving state is detected by the sensor. The sensor outputs a voltage corresponding to the driving state of the drive unit as a voltage signal. This voltage signal is converted by the voltage-current converting unit to a current signal. The current signal output from the voltage-current converting unit is transmitted through the approach and feed-back cables to the voltage conversion resistor in the voltage signal receiving section, and is further converted to an output voltage signal by the differential amplifier.

The controller can detect the driving state of the drive unit by referring to the output voltage signal, and output a control signal for controlling the driving state of the drive unit according to this output voltage signal. This control signal is transmitted through the control cable to the drive unit, and the drive unit is feed-back controlled.

The voltage signal output from the sensor is converted to a current by the voltage-current converting unit, and the current is transmitted through the cable. When a voltage is transmitted through a cable, voltage drop occurs due to an impedance of the cable, so that the signal is not transmitted accurately, but when a current is transmit through the cable, influence by an impedance of the cable is not generated, so that the signal can accurately be transmitted. Therefore, even when a driving level in the drive unit is low and a voltage output from the sensor is small, a result of detection by the sensor can accurately be communicated to the controller. As a result, even when the driving level in the drive unit is low, the driver unit can accurately be driven and controlled by the controller.

Since a voltage output from the sensor may be low, the driving unit can be driven without restriction over a range for measurement by the sensor. As a result, the driving state of the drive unit can be controlled in a wide range from a high level to a low level.

With transmission of a current, influence by an impedance of the cable is not generated, so that a signal can accurately be transmitted. With this arrangement, even if the length of the cable is long, a current signal can accurately be transmitted.

As the length of the cable may be long, a controller and a sensor may be provided with a large distance therebetween, so that a freedom in actual use of this sensor signal circuit is improved.

In the present invention, it is preferable that the drive unit includes a motor for revolving the rotator and the sensor is a revolution detector for outputting a voltage in proportion to a revolution speed of the rotator.

With the arrangement as described above, the rotator is revolved by the motor in the drive unit, and a voltage proportional to the revolution speed of the rotator is output from the revolution detector. For instance, with the arrangement in which the revolution detector is a power generator and an armature coil of the power generator is directly connected to the rotator of the motor, a voltage accurately proportional to the revolution speed of the motor can be obtained.

In the present invention, it is preferable that the controller includes a comparator for comparing the output voltage signal to a specified voltage previously set in response to a target for control of the drive unit and outputting the difference, and the controller controls the drive unit according to an output from the comparator.

With the arrangement as described above, the comparator compares the specified voltage and the output voltage signal, and outputs the difference. For insane, the output voltage signal is smaller than the specified voltage, a voltage value for requesting voltage of the difference is output. The controller drives the drive unit according to the voltage value. Then, the drive unit can be controlled in the driving state specified by the specified voltage.

The measuring instrument according to another aspect of the present invention includes a drive shaft including the above-described sensor signal circuit of the present invention and driven by the drive unit, a probe provided on the drive shaft for scanning a surface of a workpiece, and a displacement detector for detecting a displacement of the probe.

With the arrangement as described above, the drive shaft is driven by the drive unit, and the probe scans the surface of the workpiece when the drive shaft is driven. In this step, by detecting the displacement of this probe with the displacement detector, contour of the surface of the workpiece can be measured based on the detected value.

With the arrangement, the measuring instrument can provides the same effects and advantages as those provided by the invention described above. Namely, the driving state of the drive unit can be controlled in a wide range from a low level up to a high level. Therefore, a driving speed of the driveshaft can be controlled in a wide range from a low speed up to a high speed.

A voltage detected by the sensor is converted to a current proportional to the voltage, and the current is transmitted through the cable, so that a result of detection by the sensor can accurately be transmitted to the controller without being affected by an impedance of the cable. Because of this arrangement, the drive unit can accurately be controlled, and as a result a driving speed of the drive shaft can accurately be controlled.

Further, also for a displacement of the probe detected by the displacement detector, by detecting a displacement of the probe as a voltage change, converting the voltage value to a curt to transmit the current, the displacement of the probe can accurately be transmitted even when the cable is long and there is the influence of noises by the external electric field.

Since the length of the cable may be long, the controller and the sensor may be provided with a long distance therebetween. Namely, the controller and the drive unit can be installed with a lager distance therebetween. Because of this feature, a freedom degree in actual use of the measuring instrument can be improved.

DETAILED DESCRIPTION OF PREFERRED EMBODIMENT(S)

A sensor signal circuit and a measuring instrument according to an embodiment of the present invention will be described below with reference to the attached drawings.

Figure 1:
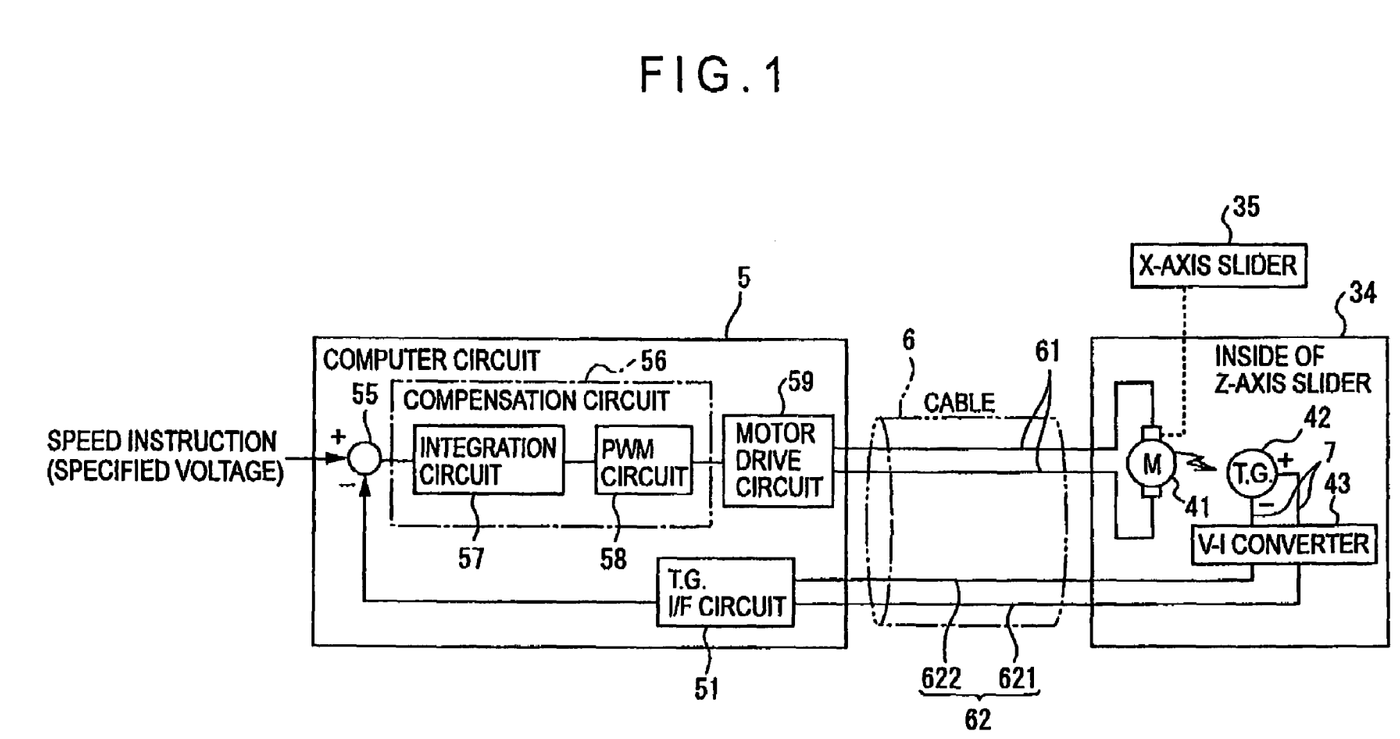
FIG. 1 is a view showing an embodiment of a measuring instrument using a sensor circuit according to the present invention.

FIG. 1 is a view showing an embodiment of the present invention, and the portions with reference numerals same as those used in description of the background technology (FIG. 6, FIG. 7, and FIG. 8) assigned thereto are the same components. Also the basic arrangement according to the present embodiment is the same as that described in the background technology, but a feature of this embodiment is that there is provided a voltage to current converter (V-I converter) 43 as a voltage-current converting unit for converting an output voltage from a tacho generator (sensor) to a current.

The voltage to current converter 43 converts a voltage signal as a sensor signal output from a tacho generator 42 to a current signal (sensor signal current). The voltage to converter 43 is provided like the tacho generator 42 in a z-axis slider 34. The tacho generator 42 and the voltage to current converter 43 are connected with a circuit line 7, which have the common reference voltage.

Figure 2:
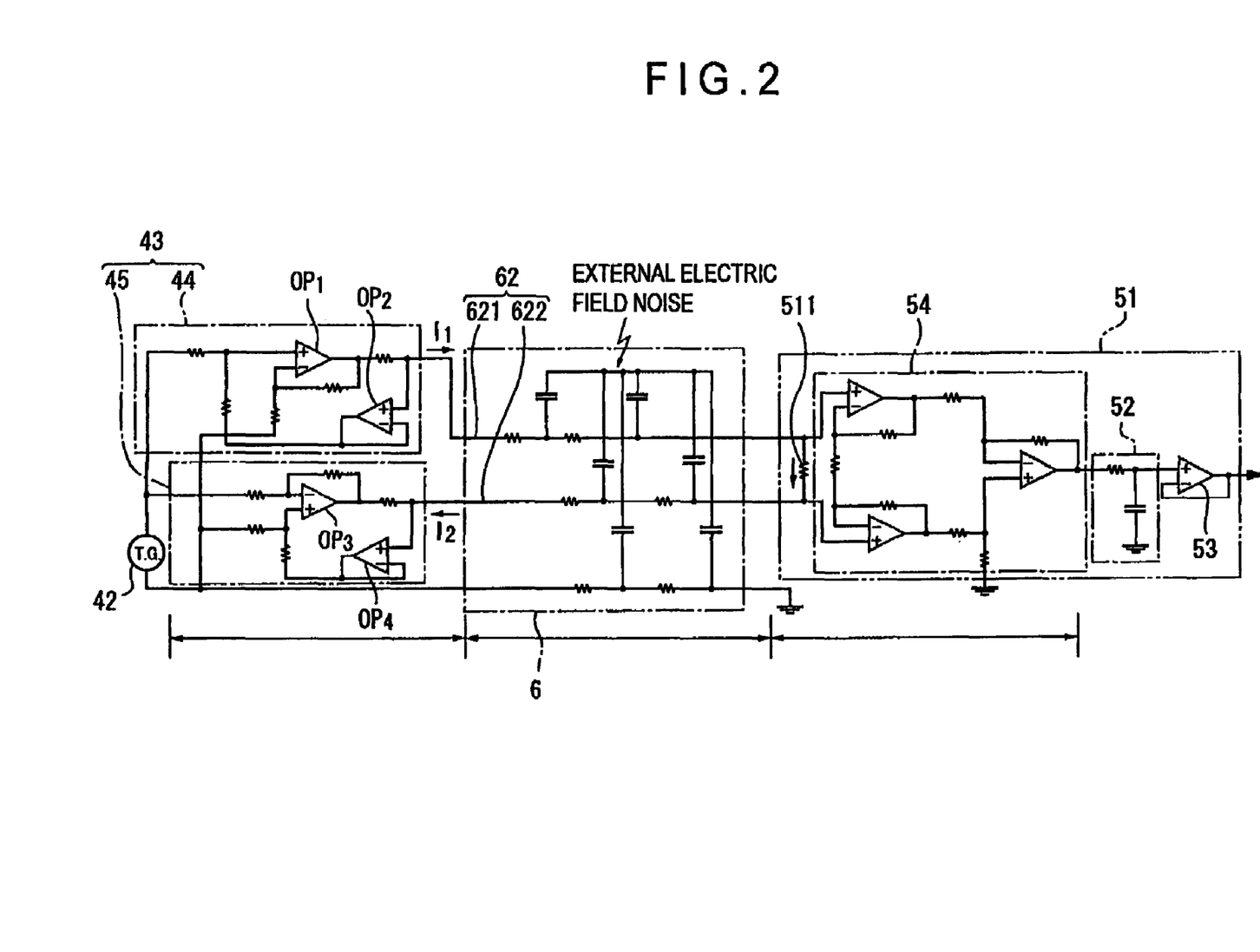
FIG. 2 is a view showing a circuit arrangement from a tacho generator up to an interface circuit in the embodiment.

FIG. 2 shows the circuit arrangement from the tacho generator 42 and voltage to cult converter 43 through a transmission line 62 in a cable 6 up to an interface circuit 51. In FIG. 2, the transmission line 62 is equivalently shown with a linear element.

The voltage to current converter 43 includes, as shown in FIG. 2, a noninverting voltage to current converter (V/+I converter) 44 for converting a voltage from the tacho generator 42 to a current in the noninverted state, and an inverting voltage to current converter (V/−I) 45 for converting a voltage from the tacho generator 42 to a current in the inverted state.

Figure 3A:
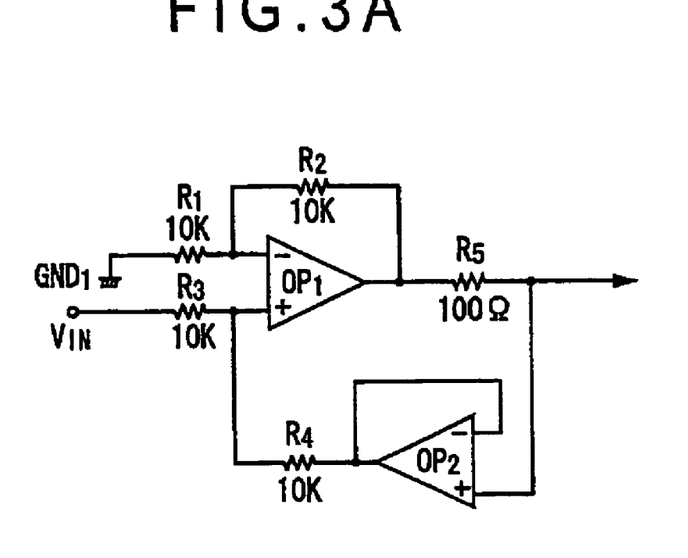
FIG. 3A is a view showing a noninverting voltage to current converter in the embodiment.

The noninverting voltage to current converter 44 includes, as shown in FIG. 3A, an operational amplifier OP1 which is a noninverting summing circuit with the noninverting input terminal (+) receiving the voltage from the tacho generator 42 and the inverting input terminal (−) grounded GND1, a voltage follower operational amplifier OP2 for feeding back an output from the operational amplifier OP1 to the noninverting input terminal (+) of the operational amplifier OP1, and resistors R1 to R5. The grounded input terminal GND1 and the ground for the tacho generator 42 have the common reference voltage.

Figure 3B:
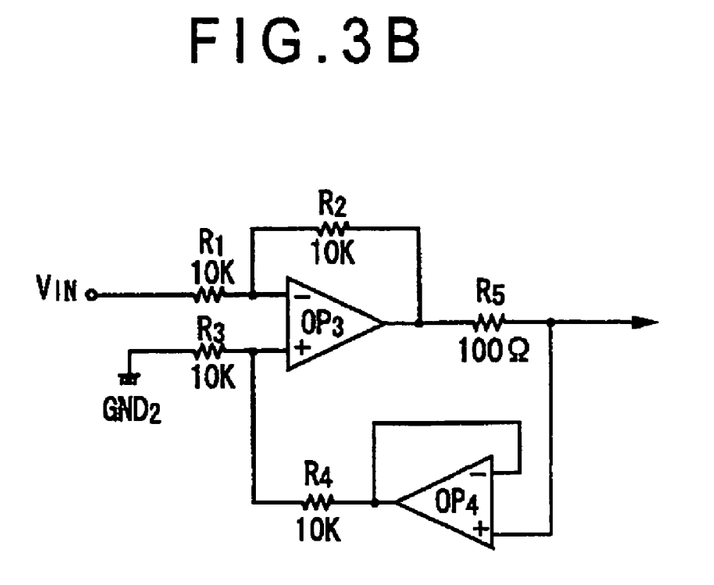
FIG. 3B is a view showing an inverting voltage to current converter.

Basic arrangement of the inverting voltage to current converter 45 is the same as that of the noninverting voltage to current converter 44 as shown in FIG. 3B, and the inverting voltage to cut converter 45 includes an operational amplifier OP3 and an operational amplifier OP4, and the voltage from the tacho generator 42 is input to an inverting input terminal (−) of the operational amplifier OP3. Further, the grounded input terminal GND2 and a grounded terminal of the tacho generator have the common reference voltage.

The voltage to current converter 43 is connected to the transmission line 62, and an output current I1 (source current) from the noninverting voltage to current converter 44 is transmitted through a feed-in cable 621, while an output current I2 (sink current) from the inverting voltage to current converter 45 is transmitted through a feed-back cable 622.

A specified voltage is input to a comparator 55. The specified voltage is set by taking into consideration an amplification degree when a set revolution speed of the motor 41 is detected by the tacho generator 42 and a result of the detection is amplified by the interface circuit 51. The comparator 55 compares the specified voltage to the output voltage value input from the interface circuit 51 and outputs the difference.

The interface circuit 51 includes, as shown in FIG. 2, a voltage conversion resistor 511, a high input impedance subtracter 54, a low-pass filter 52 and a noninverting amplify circuit 53.

The voltage conversion resistor 511 is provided between the feed-in cable 621 and the feed-back cable 622. The current I1 discharged from the noninverting voltage to current converter 44 is transmitted through the feed-in cable 621 to the voltage conversion resistor 511. The current flown to the voltage conversion resistor 511 becomes a cure I2 sank into the inverting voltage to current converter 45. A voltage V=I1R determined only by the current I1 (=|I2|) and a resistance value R of the voltage conversion resistor 511 is generated at two ends of the voltage conversion resistors 511. The voltage V at the two ends of the voltage conversion resistor 511 is still determined only by the current I1 (=|I2|) and the resistance value R of the voltage conversion resistor 511 even when noises caused by an external electric field influence on the cable 6 because a voltage changes occurs in the entire loop, and therefore the relation of voltage V=I1R is satisfied.

The high input impedance 54 functions as a differential amplifier and amplifies the voltage at two ends of the voltage conversion resistor 511 and outputs the amplified voltage. The output from the high input impedance subtracter 54 is passed through a low-pass filter 52 to remove noises therefrom, then amplified by the noninverting amplifying circuit 53, and transmitted to the comparator 55.

Operations of the measuring instrument 1 having the arrangement as described above will be described below.

First, a workpiece W is placed on the Y-axis slider 32, and the Z-axis slider is displaced so that a stylus 22 contacts a surface of the workpiece. Then, a driving speed of the X-axis slider 35 is input as the specified voltage value to the computer circuit 5. It is to be noted that the specified value is set by processing the voltage value when a predetermined revolution speed of the motor 41 is detected by the tacho generator 42 and an amplification degree in the interface circuit 51.

The specified voltage value input to the comparator 55 is transmitted via the compensation circuit 56 and motor drive circuit 59 through the transmission line 61, and the motor 41 is driven and revolved according to the transmitted signal. The motor drive circuit 59 turns ON or OFF the drive voltage according to a duty ratio of the signal subjected to pulse width modulation by the PWM circuit 58, and drives the motor 41 at a desired revolution speed. When the motor 41 revolves, the X-axis slider 35 is driven, and when the X-axis slider 35 is driven, the stylus 22 is moved for scanning in the X-axis direction along the surface of the workpiece. In this step, the stylus 22 is displaced in the Z-axis direction along irregularities on the surface of the workpiece, and displacement of the stylus 22 is transmitted as oscillation of a stylus arm 21, and is detected by the displacement detector in the X-axis slider 35.

A contour of the workpiece is measured by sampling and processing a position of the Z-axis slider 34, a position of the X-axis slider 35, and oscillation of the stylus arm 21. Further, when the Y-axis slider 32 is driven, the entire surface of the workpiece is measured.

The revolution speed of the motor 41 is detected by the tacho generator 42, and a voltage signal (sensor signal) corresponding to the revolution speed of the motor 41 is output. The voltage signal from the tacho generator 42 is converted to a current value proportional to the voltage value by the voltage to current converter 43.

The voltage from the tacho generator 42 is converted by the noninverting voltage to current converter 44 to a current I1 (source current) in the noninverted state and also to a current I2 (sink current) by the inverting voltage to current converter 45 in the inverted state, and the currents I1 and I2 are transmitted through the transmission line 62 in the cable 6.

The current I1 (source current) and the current I2 (sink current) are received by the interface circuit 51.

In the interface circuit 51, the voltage generated at the two ends of the voltage conversion resistor 511 is amplified by the high input impedance subtracter 54, and an output from the high input impedance subtracter 54 is passed through the low-pass filter 52 to remove noises therefrom and is amplified by the noninverting amplifying circuit 53 and sent to the comparator 55.

The comparator 55 compares the specified voltage value and the voltage value from the interface circuit 51, and feeds back the difference via the compensation circuit 56 and motor drive circuit 59 to the motor 41. Then, the revolution speed of the motor 41 is constantly controlled at a specified value according to the feed-back data.

With the measuring instrument 1 and the sensor signal circuit each having the arrangement as described above, the following effects are provided.

(1) The voltage output from the tacho generator 42 is converted by the voltage to current converter 43 to a current, and the current is transmitted. Because the current is transmitted, a signal can accurately be transmitted without being affected by an impedance of the cable. Because of this feature, a result of detection by the tacho generator 42 can accurately be transmitted to the computer circuit 5. As a result, the revolution speed of the motor 41 can accurately be controlled.

Further, since the signal can accurately be transmitted by sending the current, even if length of the cable 6 is long, a result of detection by the tacho generator 42 can accurately be transmitted to the computer circuit 5. As the length of the cable 6 may be lengthened, the Z-axis slider 34 and the computer circuit 5 may be installed with a large distance therebetween. For instance, although the maximum length of the cable 6 is about two meters in the prior art, the cable 6 may be extended at the maximum about six meters in the present invention. As a result, a freedom degree of the measuring instrument 1 is improved.

(2) The voltage to current converter 43 has the noninverting voltage to current converter 44 and inverting voltage to current converter 45 and transmits the current I1 (source current) in the noninverted state and the current I2 (sink curt) in the inverted state. Therefore, the induce circuit 51 can transmit the voltage signal generated in the tacho generator 42 faithfully reflecting the voltage at the two ends of the voltage conversion resistor 511. This feature is also provided even when the cable 6 is long and the currents I1 and I2 are affected by noises. Therefore, even if the length of the cable 6 is long, a revolution speed of the motor 41 can accurately be controlled.

(3) Even when the motor 41 is revolving at a low revolution speed and the output voltage from the tacho generator 42 is low, the voltage is converted to a current for transmission, so that the signal can accurately be transmitted without being affected by an impedance of the cable. Thus, a result of detection by the tacho generator 42 can accurately be transmitted to the computer circuit 5. Because of this feature, the output voltage from the tacho generator 42 may be low, so that it is not required to specify a speed ratio between the motor 41 and the tacho generator 42, and therefore it is not necessary to set any restriction over the maximum revolving speed of the tacho generator 42. Because of this feature, the motor 41 can be controlled in a wide range from a low revolution speed up to a high revolution speed. For instance, the driving speed of the X-axis slider in the prior art was in the range from 0.02 mm/s up to about 5 mm/s, but the maximum speed of 50 mm/s, which is 10 times higher than that in the prior art, is allowable in the present invention. Because the maximum driving speed of the X-axis slider 35 can be set to a value 10 times higher than that in the prior art, the measurement efficiency can substantially be improved.

(Modification 1)

A modification of the embodiment above will be described below.

Figure 4:
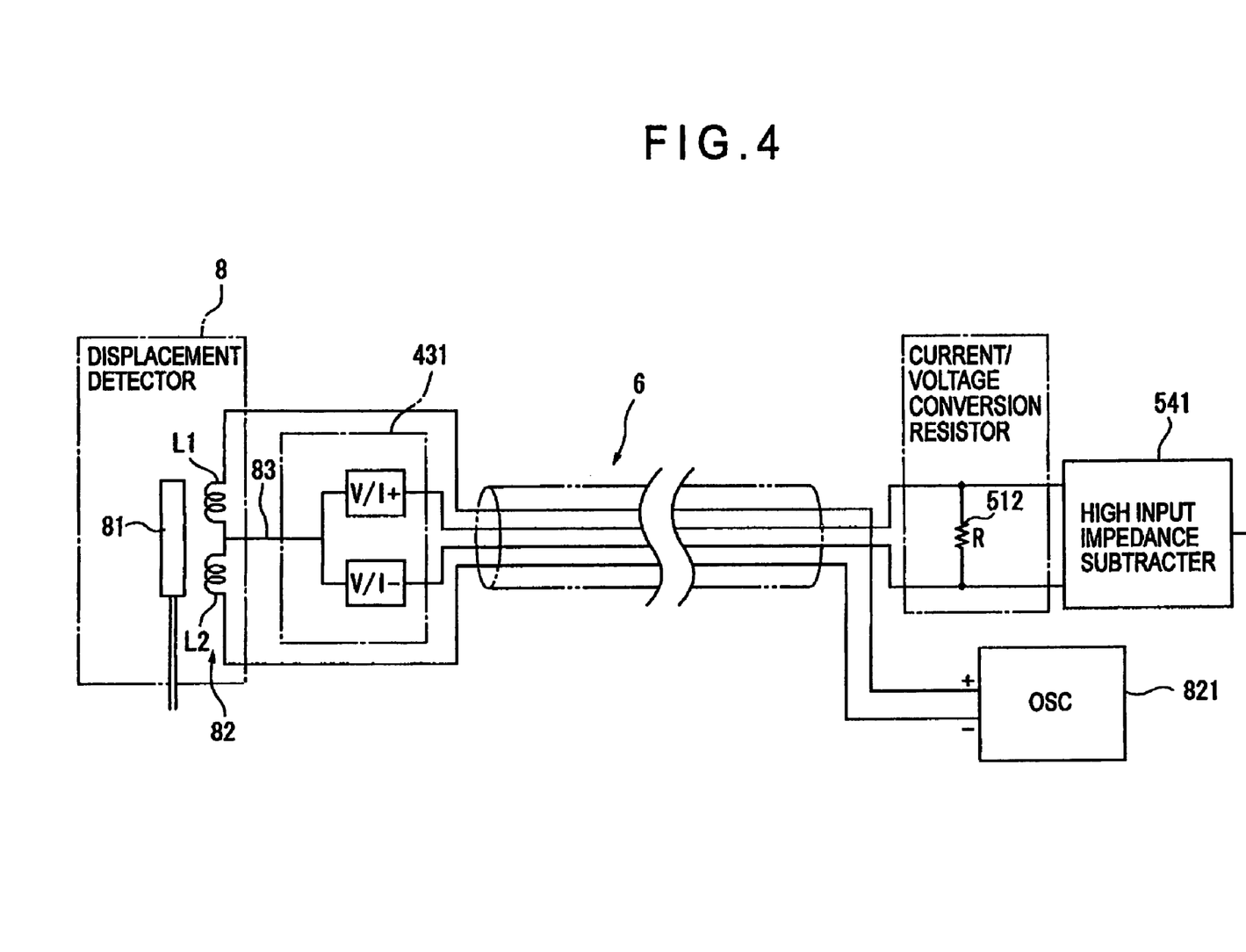
FIG. 4 is a view showing an arrangement for transmission of a result of detection by a displacement detector through a cable as a modification of the embodiment.

A feature of this modification is that a result of detection by the displacement detector as a sensor for detecting displacement of the stylus 22 is transmitted rough conversion to a current.

A displacement detector 8 is shown in FIG. 4. This displacement detector 8 is provided inside the X-axis slider 35, and includes a magnetic movable piece 81 moving in association with displacement of the stylus 22 coupled to the stylus arm 21, and a detecting section 82 for detecting displacement of this movable piece 81.

The detecting section 82 has two coils L1 and L2 positioned in parallel to the moving direction of the movable piece 81. The coil L2 and coil L2 are connected in series, and a sinusoidal wave from an oscillation circuit 821 is loaded thereto. The coils L1 and L2 are connected to each other with a voltage output cable 83, and a voltage to current converter 431 is connected to this voltage output cable 83.

When the movable piece 81 is displaced, the output voltage is changed in response to a difference between an induced electromotive force of the coil L1 and that of the coil L2. The output voltage is subjected to voltage-current conversion by the voltage to current converter 431 in the noninverted state as well as in the inverted state, and then the voltage is obtained by a voltage conversion resistor 512 provided inside the computer circuit 5. This voltage is amplified by a high input impedance subtracter 541, and the amplified voltage is converted to displacement of the stylus 22 through a prespecified processing, and the displacement of the stylus, 22 is displayed, for instance, on a display unit. With the arrangement as described above, the following effects are provided.

Displacement of the stylus 22 is detected by a detecting section 82 as a voltage change, and a result of the detection is accurately transmitted and obtained by the voltage conversion resister 512. Even when noises due to electromagnetic coupling give some influences to the cable, the sink current and source current forms a loop because of current conversion by the voltage to current converter 431, so that the voltage value is always correctly transmitted to the computer circuit 5. Because of this feature, even when the voltage value output from the detecting section 82 is very small, and further even if the cable is long, the displacement of the stylus 22 can accurately be transmitted to the computer circuit 5.

Figure 5:
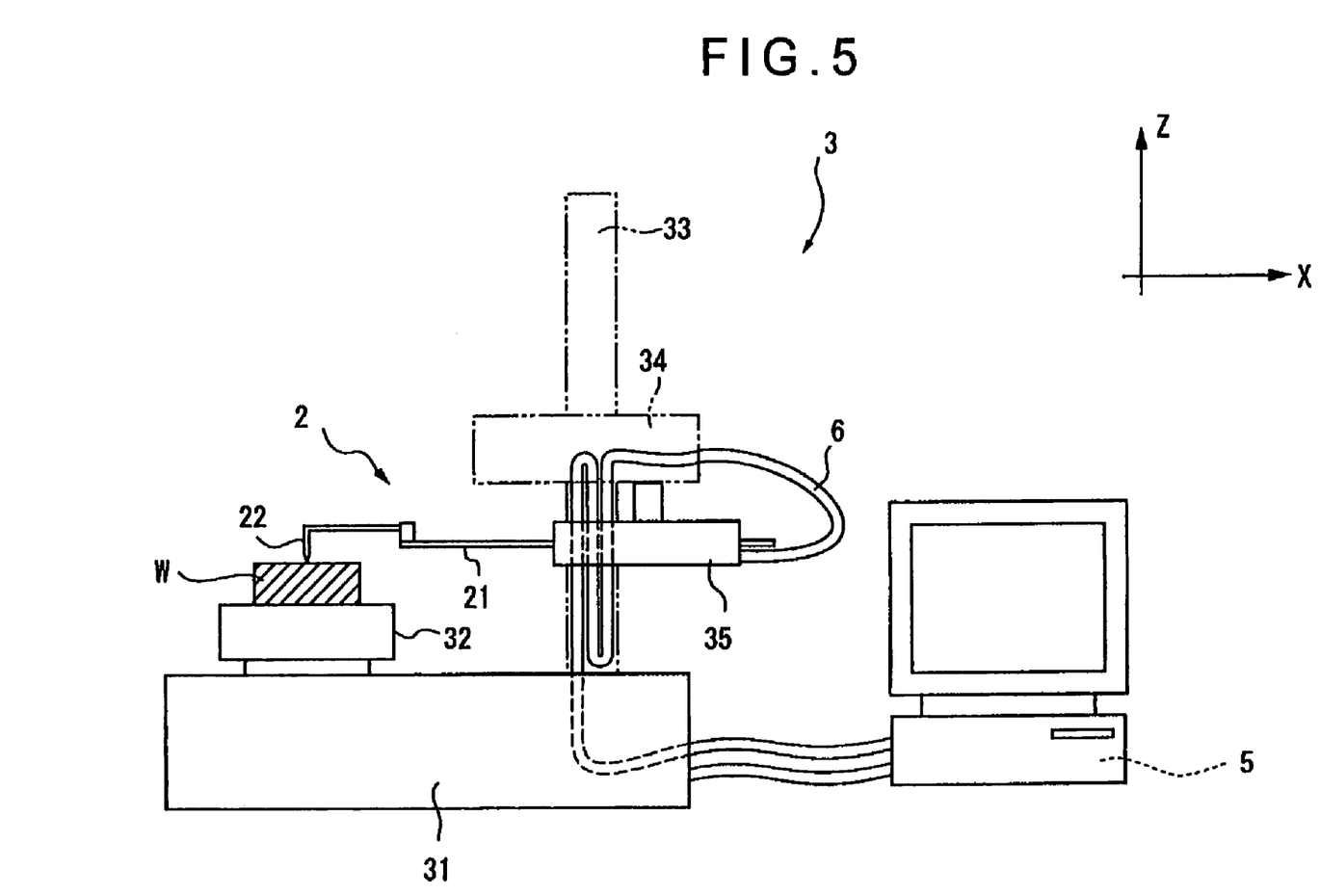
FIG. 5 is a view showing an arrangement in which cable is accommodated in a Z-axis drive shaft and is drawn out from a table as an application of the modification of the embodiment.

As the cable may be long, as shown in FIG. 5, the arrangement is allowable in which the voltage output cable 83 may be connected from the X-axis slider 35 via the Z-axis drive shaft 33 and through the table 31 to the computer circuit 5. When the cable is drawn from a driven portion such as the X-axis slider 35, the cable is frequently moved, so that it is dangerous and also the cable is easily damaged. To avoid this problem, the cable is accommodated in the Z-axis drive shaft 33 or a fixed portion of the table 31 or the like, and the cable is drawn from the fixed portion. With this arrangement, movement of the cable is reduced, and also damages of the cable are prevented with the safety insured.

The sensor signal circuit and measuring instrument according to the present invention is not limited to the embodiment described above, and various modifications can be made without deviating from the purpose of the present invention.

In the embodiment described above, the sensor is a tacho generator including a generator attached to a rotator of a motor, but the present invention is not limited to this arrangement, and any type of sensor can be employed on the condition that a voltage waveform can be output.

The driver is not limited to a motor, and any type of driver may be employed. For instance, a driver using a solid element such as a piezoelectric element or a magnetically distorting element may be employed, and also an actuator such as an electromagnetic actuator may be employed.

The controller is not limited to the computer circuit described above, and any types of control circuit may be employed on the condition that a feed-back control can be made.

The measuring instrument is not limited to a contour measuring instrument as described above, and any type of measuring instrument may be employed on the condition that the measuring instrument includes a driver, a sensor for detecting the driving state of the driver, and a controller for proving feed-back control based on a result of detection by the sensor.

The displacement detector 8 is not limited to that having the arrangement described above, and any type of sensor capable of reading a displacement of the stylus 22 as a voltage value such as a static capacitance type of encoder having a movable electrode plate displaced in association with displacement of the stylus 22 and a fixed electrode plate placed at a position opposite to the movable electrode plate may be employed.

As described above, with the signal sensor circuit and measuring instrument according to the present invention, there is provided the effect that influence by noises due to electromagnetic coupling in a cable connecting a voltage signal transmitting section to a voltage signal receiving section can be reduced to accurately transmit a signal.

The priority application Number 2004-116972 upon which this patent application is based is hereby incorporated by reference.

What is claimed is:

1. A sensor signal circuit comprising:
a voltage signal transmitting section having a sensor for transmitting a result of detection as a voltage signal;
a voltage signal receiving section for receiving the voltage signal;
a cable for connecting the voltage signal transmitting section and the voltage signal receiving section to define a voltage signal transmitting side and a voltage signal receiving side;
a voltage/current converter provided in the voltage signal transmitting side, the voltage/current converter having a noninverting voltage/current converter for converting the voltage signal to a noninverted current signal and an inverting voltage/current converter for converting the voltage signal to an inverted current signal, the noninverted and inverted current signals corresponding to the voltage of the voltage signal;
a voltage converter provided in the voltage signal receiving side for converting the noninverted and inverted current signals to a voltage to obtain the voltage signal;
the cable comprising: a feed-in cable for transmitting the noninverted current signal from the noninverting voltage/current converter to the voltage converter; and
a feed-back cable for transmitting the inverted current signal returning from the voltage converter to the inverting voltage/current converter.

2. The sensor signal circuit according to claim 1,
wherein the voltage converter has a voltage conversion resistor, and a differential amplifier circuit for converting voltage at two ends of the voltage conversion resistor to an output voltage signal.

3. The sensor signal circuit according to claim 2,
wherein the voltage signal transmitting section has a drive unit and the sensor for detecting a driving state of the drive unit and outputting a result of detection as the voltage signal;
the voltage signal receiving section has a controller for providing feedback control for the driving state of the drive unit based on the voltage signal; and
further there is provided a control cable for transmitting a control signal from the controller to the drive unit.

4. The sensor circuit according to claim 3,
wherein the drive unit has a motor for revolving a rotator; and
the sensor is a revolution detector for outputting a voltage in proportion to the revolution speed of the rotator.

5. The sensor signal circuit according to claim 3,
wherein the controller has a comparator for comparing the output voltage to a specified voltage previously set in response to a target for control of the drive unit; and
the controller drives and controls the drive unit according to an output from the comparator.

6. A measuring instrument comprising:
a drive unit;
a voltage signal transmitting section having a sensor for detecting a driving state of the drive unit and outputting a result of detection as the voltage signal;
a voltage signal receiving section having a controller for providing feedback control for the driving state of the drive unit based on the voltage signal;
a control cable for transmitting a control signal from the controller to the drive unit;
a voltage to current converter having a noninverting type converter provided in the voltage signal transmitting section side for converting the voltage signal to a current in the noninverted state and an inverting type voltage to current converter for converting the voltage signal to a current in the inverted state, for the voltage to current converter converting the voltage signal to a current signal corresponding to the voltage thereof;
a voltage converter provided in the voltage signal receiving section side for converting the current signal and having a voltage conversion resistor and a differential amplifier circuit for converting voltage at two ends of the voltage conversion resistor to an output voltage signal to a voltage to obtain the voltage signal;
a feed-in cable for transmitting the current signal from the noninverting type voltage to current converter to the voltage converter;
a feed-back cable for transmitting the current signal returning from the voltage converter to the inverting type voltage to current converter;
a drive shaft driven by the drive unit;
a probe provided on the drive shaft for scanning a surface of a workpiece; and
a displacement detector for detecting a displacement of the probe.

7. The measuring instrument according to claim 6,
wherein the drive unit has a motor for revolving a rotator; and
the sensor is a revolution detector for outputting a voltage in proportion to the revolution speed of the rotator.

8. The measuring instrument according to claim 6.
wherein the controller has a comparator for comparing the output voltage to a specified voltage previously set in response to a target for control of the drive unit; and
the controller drives and controls the drive unit according to an output from the comparator.

* * * * *